Figure 1:
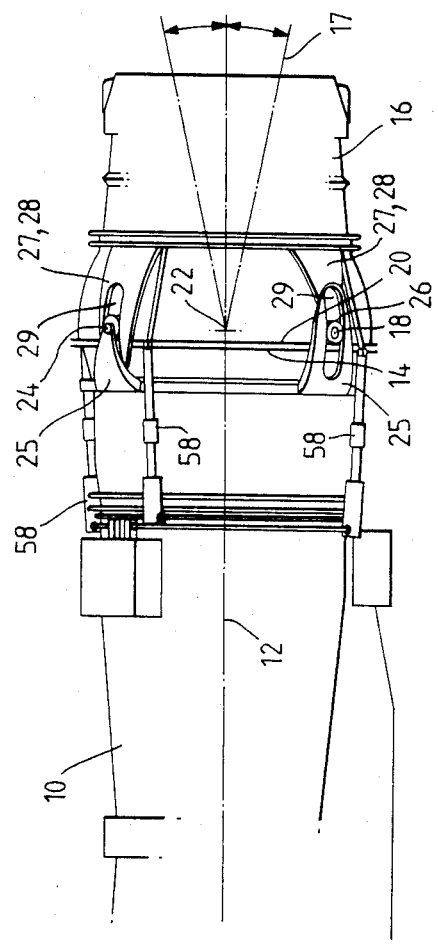

United States Patent [19]

Nightingale

[11] Patent Number: 4,984,741
[45] Date of Patent: Jan. 15, 1991

[54] VECTORABLE VARIABLE FLOW AREA PROPULSION NOZZLE

[75] Inventor: Douglas J. Nightingale, Jonesboro, Ga.

[73] Assignee: Rolls-Royce Inc., Greenwich, Conn.

[21] Appl. No.: 200,850

[22] Filed: Jun. 1, 1988

Related U.S. Application Data

[63] Continuation-in-part of Ser. No. 19,121, Feb. 26, 1987, abandoned.

[51] Int. Cl.⁵ .............................................. B63H 25/46
[52] U.S. Cl. ........................... 239/265.17; 239/265.25; 239/265.39
[58] Field of Search ..................... 239/265.35, 265.25, 239/265.39, 265.17, 265.37, 265.33; 60/226.1, 226.2, 228, 229, 271; 244/12.5, 23 D

[56] References Cited

U.S. PATENT DOCUMENTS 4,463,902 8/1984 Nightingale .................... 239/265.17
4,502,637 3/1985 Nightingale .................... 239/265.17

Primary Examiner—Donald P. Walsh
Attorney, Agent, or Firm—Cushman, Darby & Cushman

[57] ABSTRACT

A vectorable propulsion nozzle has first and second ducts 10, 16 attached to each other by gimbal attachment means 18 to allow universal swivelling of vectoring in any lateral direction. The second duct 16 comprises a supporting ring 28 which has a plurality of guide means 36 in which arcuate ribs 41 are slidably mounted. Each rib 41 is formed integrally with a master flap 38 which together with slave flaps 44 define the geometry and outlet area of the nozzle. To facilitate varying the throat area of the nozzle the flaps 38, 44 are moved bodily along the guide means by actuators. The area of the nozzle can thus be altered independently of the swivelling of the second duct 16. The supporting ring 28 also has formed therein a plurality of openings 30 for thrust reversing which are uncovered when reverser doors 32 are deployed.

11 Claims, 11 Drawing Sheets

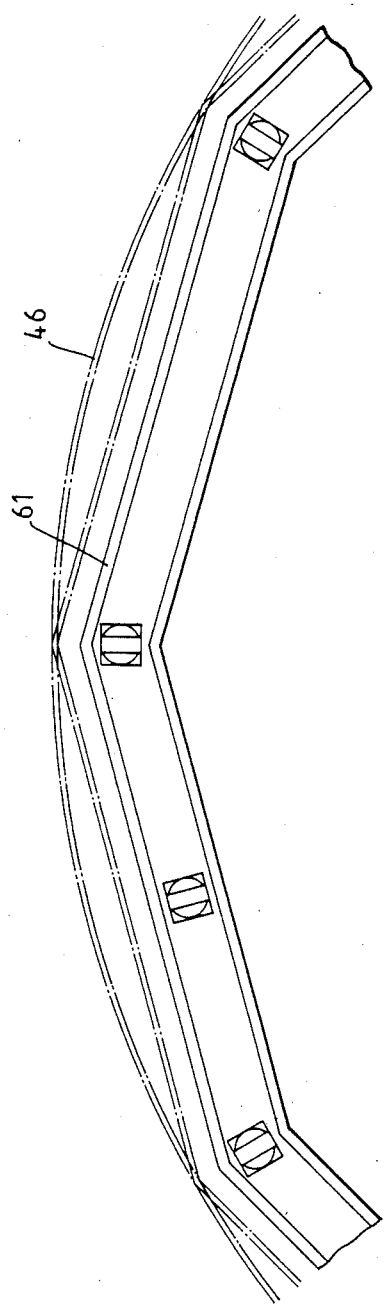

VECTORABLE VARIABLE FLOW AREA PROPULSION NOZZLE

This is a continuation-in-part application of Ser. No. 019,121, filed Feb. 26, 1987, which was abandoned upon the filing hereof.

It is already well known in the art to provide a vectorable nozzle which comprises a relatively fixed jet pipe and a downstream pipe which is attached to the jet pipe with gimbal means to enable the downstream pipe to be universally swivable with respect to the fixed pipe such that the gas efflux from the nozzle may be vectored both sideways (yaw) and up and down (pitch) in relation to the longitudinal axis of an aircraft provided with such a nozzle. In this way the thrust may be selectively directed for high manouvrability. Such nozzles are described in GB Pat. Nos. 1248573 and 1250491 for example.

More sophisticated nozzles require variable flow area mechanisms where afterburner systems are used to augment jet thrust, and thrust reversal means to reduce landing distance.

Gimbal nozzles of the type described above can have sealing problems due to the very high moment exerted on the nozzle when the gas efflux is vectored causing ovality. This problem may be compounded when variable area means are included in the nozzle. Furthermore it is also desirable to incorporate thrust reversal means into the nozzle in order to produce a relatively light and compact unit.

It is an object of the present invention to provide a vectorable nozzle of the gimbal type described above with variable area means and thrust reversal means combined therein.

It is a further object to provide a vectorable nozzle which is relatively stiff in order to sealing problems associated with ovality.

These objects are achieved according to the present invention by a vectorable variable area propulsion nozzle for a gas turbine aero-engine, the nozzle comprising a first duct having a longitudinal axis, a second duct having a longitudinal axis, a gimbal attachment means for connecting an upstream end of the second duct to a downstream end of the first duct thereby to allow universal swivelling of the second duct relative to the first duct so that the longitudinal axis of the second duct intersects the longitudinal axis of the first duct at a fixed swivel point when the second duct is swivelled, and a first actuator means operable on the second duct to swivel the second duct relative to the first duct characterised in that the second duct comprises a supporting ring which is free to swivel relative to the first duct but is constrained against rotation about its longitudinal axis by means of circumferentially spaced pivots of the gimbal attachment means, the supporting ring having a plurality of guide means extending in a direction along the axis, there being a plurality of flaps which define the geometry and outlet area of the nozzle and the flaps being provided with means which co-operate with the guide means to define a trackway along which the flaps can move bodily relative to the supporting ring thereby to vary the outlet area of the nozzle, and actuator means operable to move the flaps along the guide means.

Figure 2:
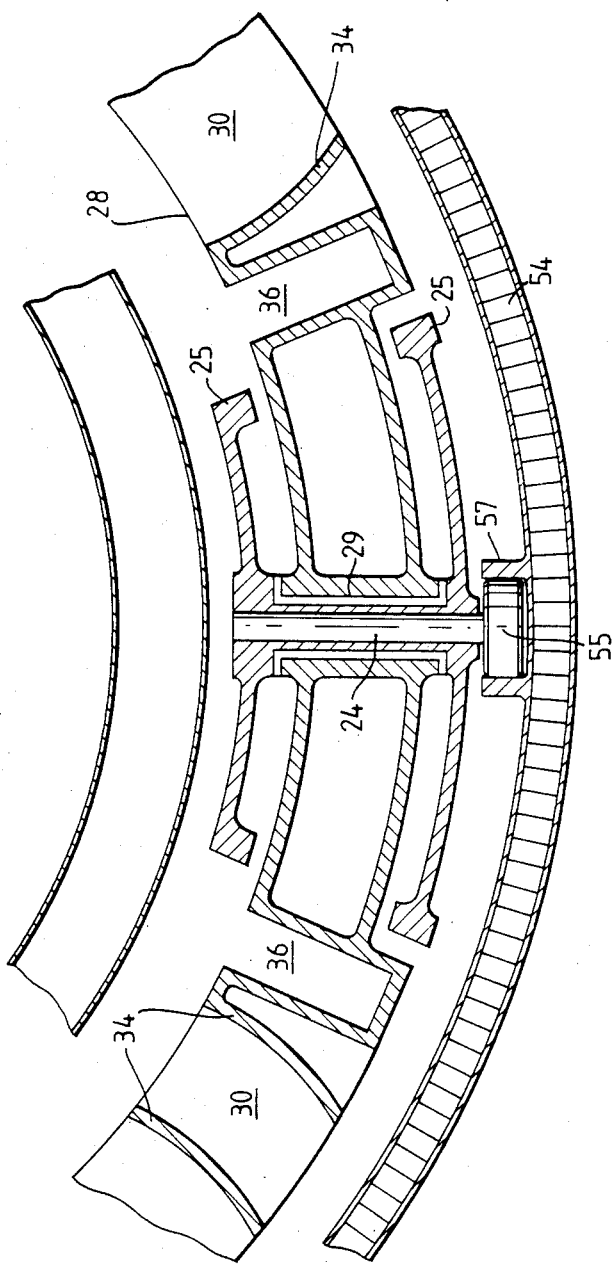
Figure 3:
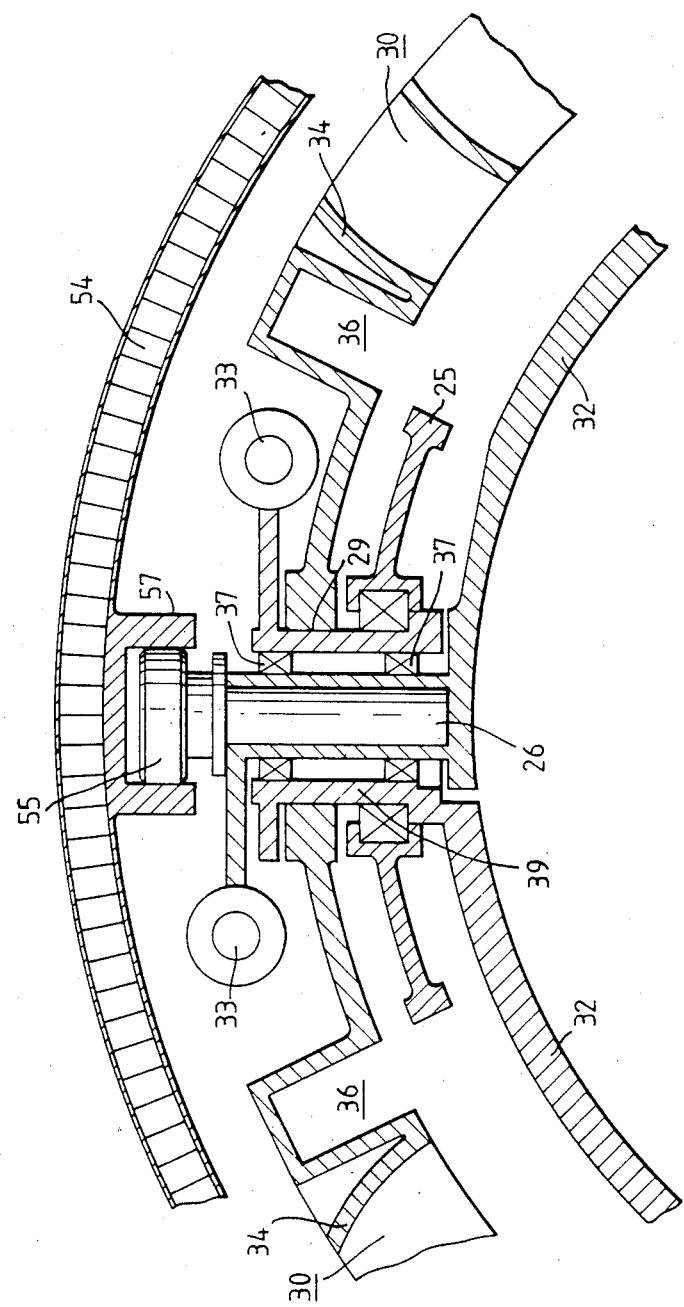
Figure 4:
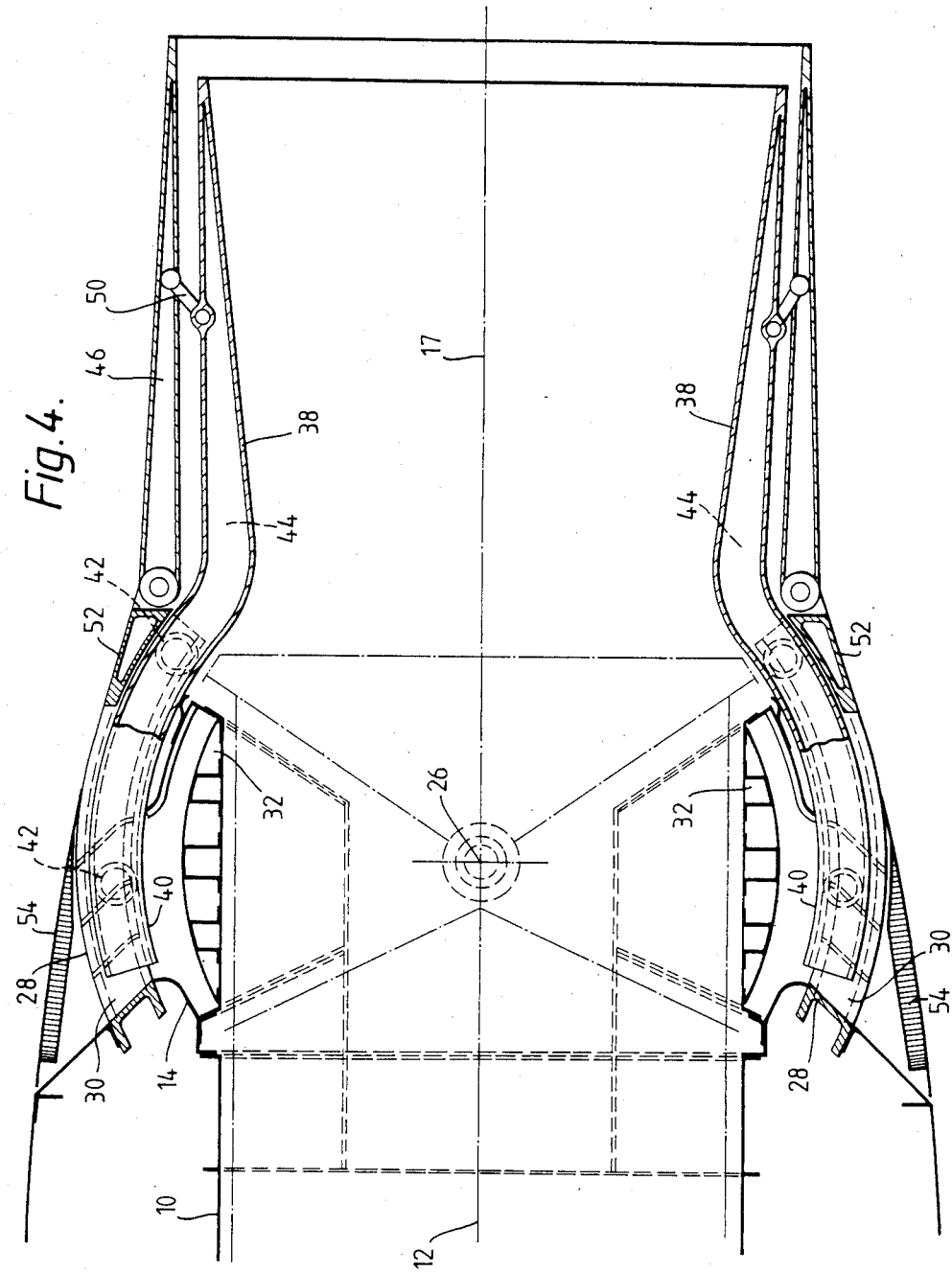
Figure 5:
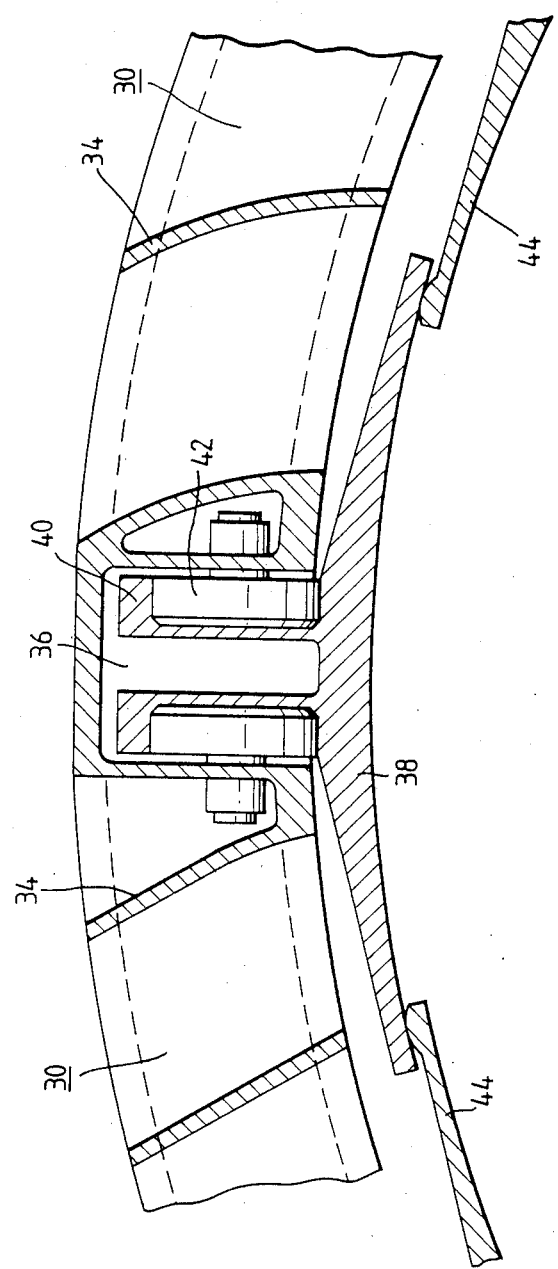
Figure 6:
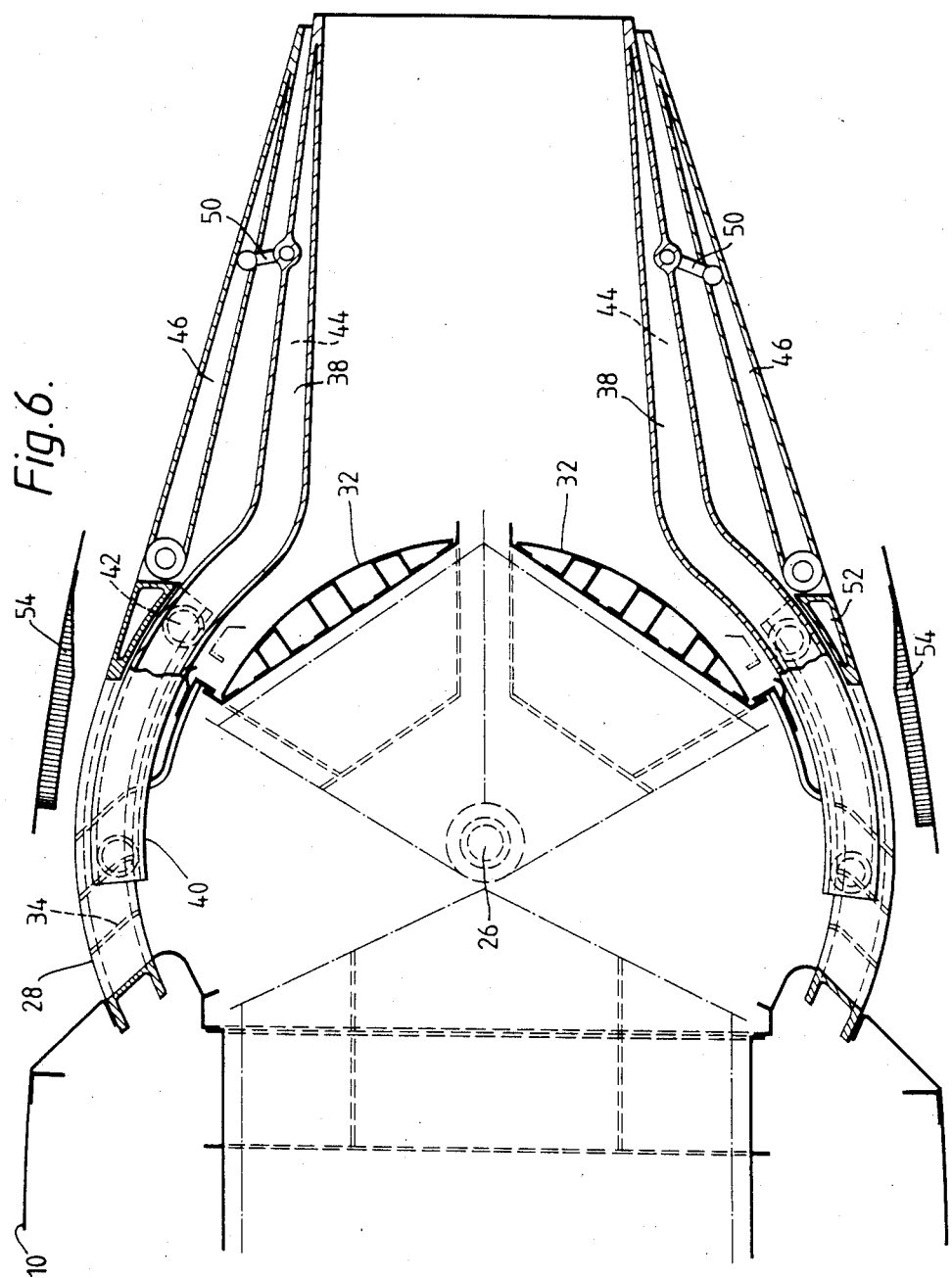
Figure 7:
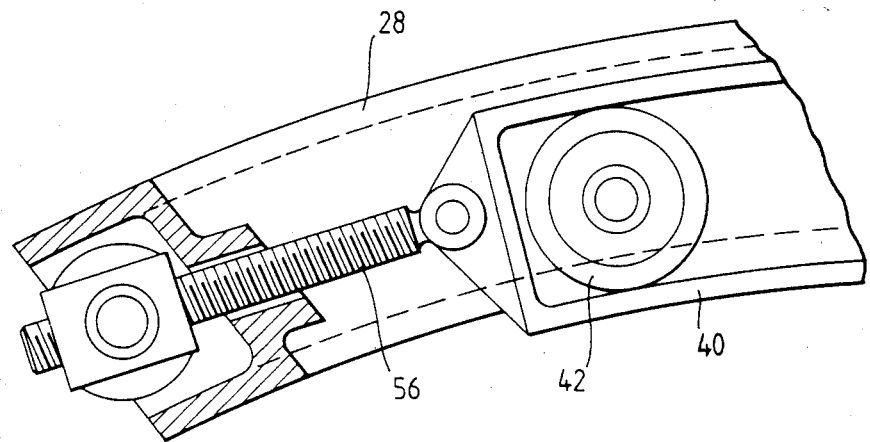
Figure 8:
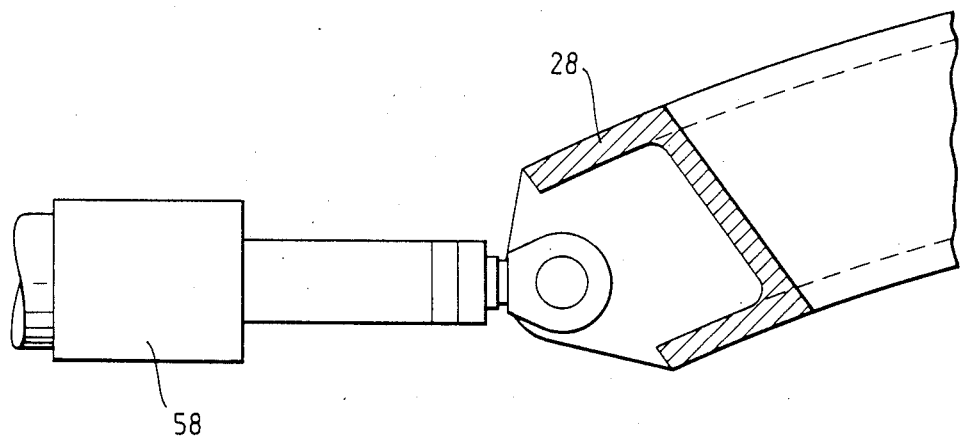
Figure 9:
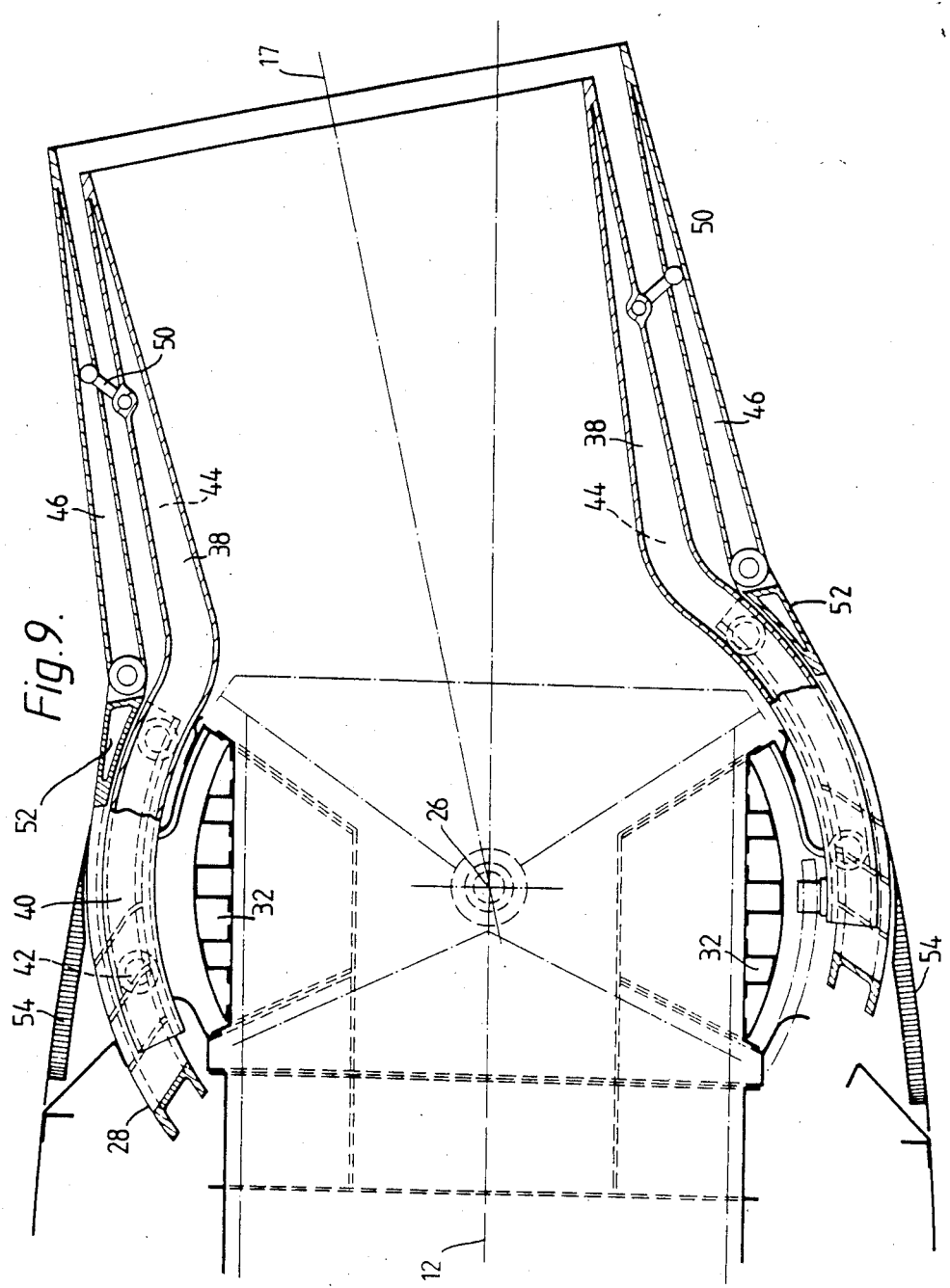
Figure 10:
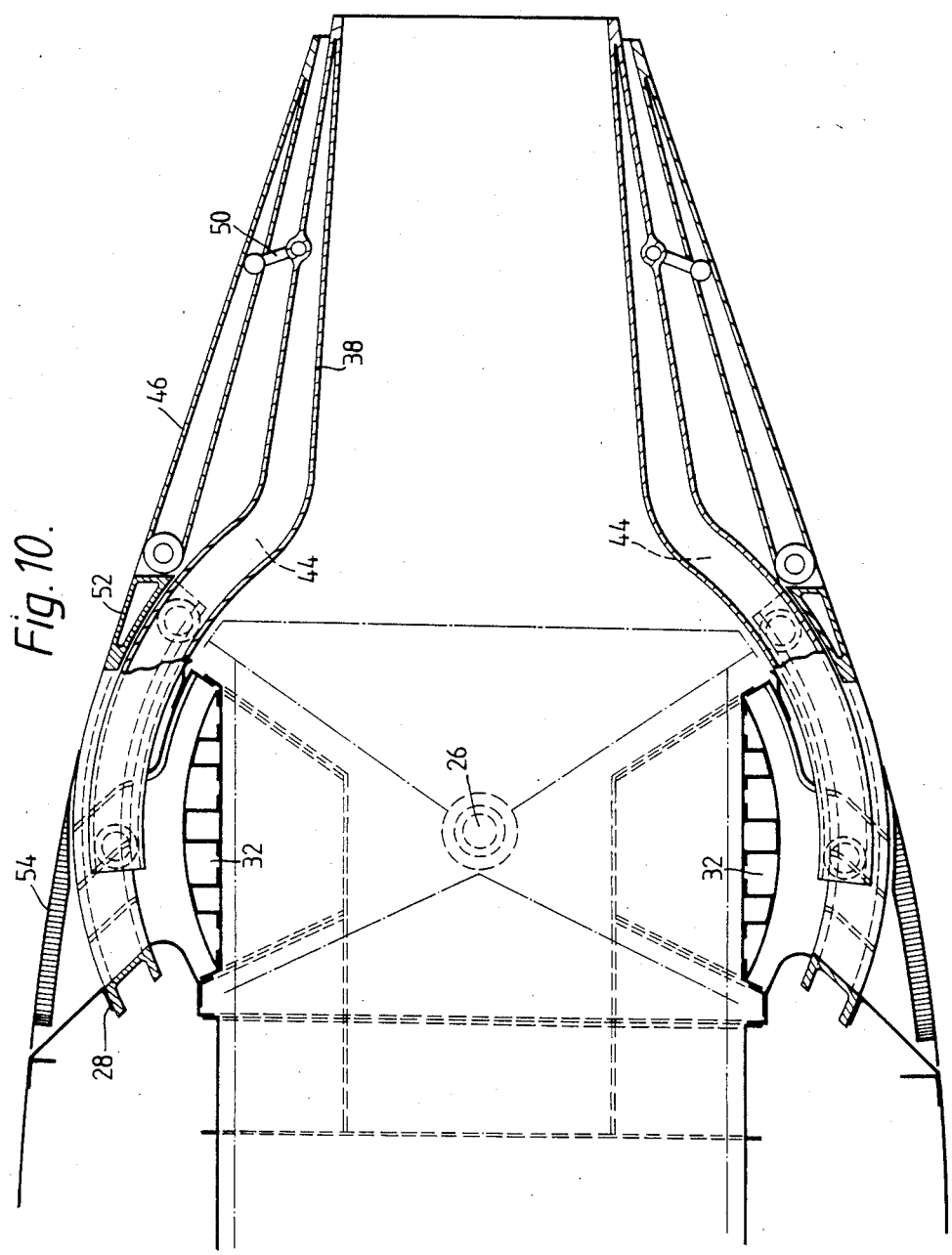
Figure 11:
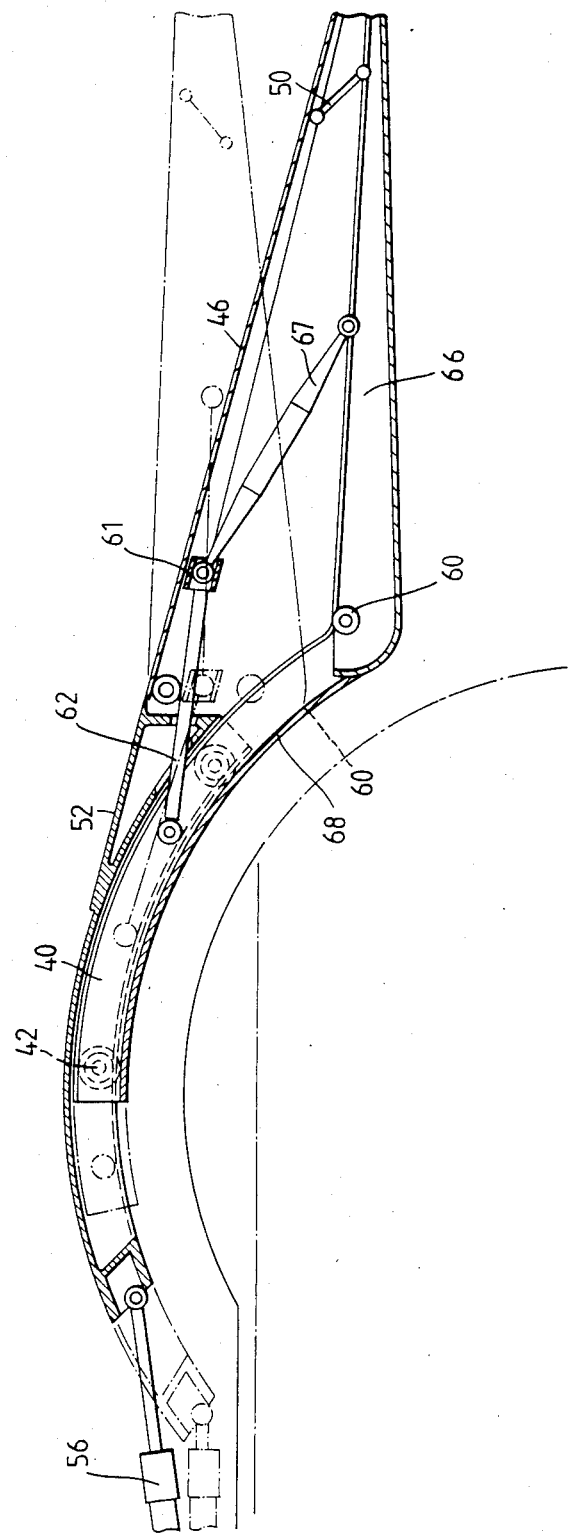

The invention will now be described by way of example with reference to the accompanying drawings in which:

FIG. 1 illustrates one nozzle according to the present invention,

FIGS. 2 and 3 are sectional views of the gimbal arrangement, of an alternative nozzle to that shown in FIG. 1, FIG. 4 is a sectional view of a second nozzle constructed in accordance with the present invention, FIG. 5 shows the flap arrangement of the nozzle of FIG. 4 in more detail, FIG. 6 shows the nozzle of FIG. 4 in a reverse thrust mode, FIG. 7 and 8 show the flap actuation means and the vectoring (swivelling) actuation means respectively of the nozzle of FIG. 4, FIGS. 9 and 10 show the nozzle of FIG. 4 in various modes, and FIGS. 11 and 12 show a third version of the nozzles of FIG. 1 and 4.

Referring to FIG. 1 the nozzle comprises a fixed first duct 10 having a longitudinal axis 12 terminating at a downstream end 14, a second duct 16 having a second longitudinal axis 17 downstream of the first duct 10, and gimbal attachment means 18 for connecting an upstream end 20 of the second duct to the downstream end 14 of the first duct. The gimbal attachment means 18 allows universal swivelling of the second duct 16 relative to the first duct so that when the second duct is swivelled the second longitudinal axis 17 intersects the first longitudinal axis at a fixed swivelling point 22 irrespective of the relative position of the second duct to the first.

The gimbal attachment means comprises four pivots 24, 26 placed at 90° apart to provide lateral movement in any direction. The pivots 24 are carried by two fixed arms 25 which are attached to the fixed duct 10 and the pivots 26 are carried by two arms 27 which constitute part of a support ring 28 on which the second duct 16 is carried. The pivots 24 and 26 locate in elongate slots 29 in respectively the arms 27 and 25, to allow the support ring 28 to swivel.

The supporting ring 28 (best seen in FIG. 4) is arcuate in section to provide for universal swivelling. The ring 28 has four openings 30 which have cascade vanes 34 through which reversed flow exhaust gas can be directed. Normally during forward thrust the openings 30 are covered by the two doors 32.

The second duct 16 also includes an axisymetric array of flaps 38, 44 which are described below with reference to FIGS. 2 to 10. The flaps 38, 44 are movable bodily relative to the ring 28 as described below and their means of attachment to ring 28 is exactly as described below.

Referring in particular to FIGS. 2 to 10 there is shown a second form of nozzle, constructed in accordance with the present invention, which only differs from that shown in FIG. 1 in so far as concerns the specific detail of the location of the slots 29. In FIG. 1 the slots 29 are in the respective arms 25, 27; in FIGS. 2 to 10 the slots 29 are in the ring 28.

Referring to FIG. 2 the pivots 24 are each carried by a pair of fixed arms 25, which are attached to fixed structure of the engine. The pivots 24 are located in slots 29 in the supporting ring 28 which extend longitudinally. The slots 29 allow the ring 28 to move freely into and out of the plane of the drawing of FIG. 2. Axial forces on the ring 28 are reacted by the fixed structure through the actuators 58 (see FIG. 8) whereas circumferential forces are reacted by the pivots 24, 26. The outer end of each pivot 24 has a roller 55 which locates in a guideway 57 in a translatable outer fairing sleeve 54 (best seen in FIG. 4).

Referring to FIG. 3 the pivots 26 are very similar to the pivots 24 in that they are carried by fixed arms 25 mounted on fixed structure of the engine and each has a roller 55 at its outermost end which locates in a guideway 57 in the translatable outer fairing sleeve 54. Mounted on each pivot 26 are two thrust reverser doors 32. A first door 32 has a bore in which the pivot 26 locates and the other door 32 is mounted on bearings 37 which are carried by the spindle of the first door 32. Again the supporting ring 28 has longitudinally extending slots which allow the ring 28 to move over the outer spindle 39 of the door 32.

In a first position (FIG. 4) the doors 32 obturate the openings 30 and allow a gas efflux to flow through the two ducts. When deployed in a second position, (FIG. 6) the two doors 32 uncover the openings 30 and combine to block the second duct and divert the gas efflux through the openings 30 for reverse thrust. A sleeve fairing 54 translates aft when the reverser doors are rotated in order to allow the jet efflux to escape. Actuator jacks 33 are provided for rotating the doors 32 about the axes of the pivots 26. Thrust loads on the doors 32 are reacted by the fixed structure through the pivots 26.

Integrally formed in the supporting ring 28 are a Plurality of guide means in the form of track rail beams 36. The second duct 16 further includes a plurality of master flaps 38 for varying the flow area of the nozzle. Integrally formed, or connected with each master flap 38, is an arcuate rib 40 which slidably engages each track rail beam 36 by virtue of rollers 42. Referring to FIG. 7 there is shown details of the actuation means 56 which is mounted on the supporting ring 28 and acts on each rib 40 in order to cause them to slide in the track rail beams 36 to vary the area of the nozzle. In this way, the area of the nozzle is varied by sliding the master flaps bodily along the track rail beams 36 independently of the vectoring position of the second duct 16 with respect to the first 10. This also provides a relatively stiff arrangement to prevent ovality of the second duct. A plurality of interconnecting slave flaps 44 are also provided, (see FIG. 5) in a manner well known in the art, (GB Pat. No. 1567941 for example) to provide a continuous duct wall. These flaps 44 have features which engage the master flaps 38 so that they are pulled axially with the flaps 38 but allow circumferential expansion and contraction and also have features which prevent them collapsing inwards. To reduce aircraft drag, a similar number of fairing flaps 46 are provided radially outward of the master flaps and are connected thereto via hinged links 50. The fairing flaps 46 are hinged at their downstream end to a ring 52 which is formed integrally with the supporting ring 28.

FIG. 8 shows the actuation means 58 for swivelling the supporting ring 28 and hence the second duct 16. The actuation means 58 are attached to the relatively fixed first duct and act on the supporting ring 28 in order to swivel the second duct 16. Both actuation means 56, 58 comprise a plurality of synchronised actuators for system redundancy.

FIGS. 9 and 10 show the nozzle of FIGS. 2 to 8 in various vectoring and throat area positions.

FIG. 11 shows a more sophisticated version of the nozzle in which divergent master flaps 66 are hinged to convergent master and slave flaps 68 and 60 respectively. Each divergent flap is arcuate and is connected via a strut 67 to a unison ring 61 (shown in FIG. 12) which itself is connected via a link rod 62 to the supporting ring 28. Again there is provided a plurality of outer flaps 46, each pivotally connected at its upstream end to the supporting ring 28 and connected by way of pivotal links 50 to each flap 66. The strut 62 may be of a hydraulic jack which can be lengthened or shortened to vary the amount of divergence of flaps 66.

The main advantage of the present invention is that the supporting ring 28 performs three functions. It provides support for the cascade of vanes 34 in each opening 30 as well as supporting the master flaps 38 by virtue of the track rail beams 36 slidably engaged by the I-section ribs 40 which are the backbone of the master flaps 38 and thirdly provides for universal swivelling of the second duct by virtue of attachment to the gimbal attachment means 18.

I claim:

1. A vectorable variable area propulsion nozzle for a gas turbine aero-engine, the nozzle comprising a first duct having a longitudinal axis, a second duct having a longitudinal axis, a gimbal attachment means for connecting an upstream end of the second duct to a downstream end of the first duct thereby to allow universal swivelling of the second duct relative to the first duct so that the longitudinal axis of the second duct intersects the longitudinal axis of the first duct at a fixed swivel point when the second duct is swivelled, and a first actuator means operable on the second duct to swivel the second duct relative to the first duct, the second duct comprising a supporting ring which is free to swivel relative to the first duct but is constrained against rotation about its longitudinal axis by means of circumferentially spaced pivots, of the gimbal attachment means, the supporting ring having a plurality of guide means extending in a direction along the axis, there being a plurality of first flaps which define the geometry and outlet area of the nozzle and the flaps being provided with means which co-operate with the guide means to define a trackway along which the flaps can move bodily relative to the supporting ring thereby to vary the outlet area of the nozzle, and actuator means operable to move the flaps along the guide means.

2. A nozzle according to claim 1 wherein there are four pivots equispaced around the circumference to define two orthogonal pivotal axes.

3. A nozzle according to claim 2 wherein there are two pairs of pivots, one pair of which is carried by fixed structure of the engine which locate in slots in the supporting ring and the other pair of which is carried by the supporting ring and locates in slots in the fixed structures of the engine.

4. A nozzle according to claim 1 wherein all the pivots are carried by fixed structure of the engine and the pivots locate in slots in the supporting ring.

5. A nozzle according to claim 1 wherein the supporting ring has openings through which can be directed a reversed flow of engine exhaust gases, and there is provided two thrust reverser doors pivotally mounted on two of the pivots, the thrust reverser doors being movable to and from a first position where they cover the openings, to and from a second position where they uncover the openings and about each other to redirect the flow of exhaust gases out of the openings.

6. A nozzle according to claim 1 wherein the guide means comprises an arcuate track, and the means which co-operates with the guide means comprises an arcuate rib on which is mounted rollers which run along the track.

7. A nozzle according to claim 1 wherein the first flaps comprise an arcuate upstream portion which defines a convergent part of the nozzle and a downstream divergent portion which defines a divergent part of the nozzle.

8. A nozzle according to claim 7 wherein there is provided a plurality of outer flaps pivotally attached at their upstream ends to the supporting ring and are connected by links to the first flaps.

9. A nozzle according to claim 1 wherein the first flaps are of arcuate shape in cross section.

10. A nozzle according to claim 9 wherein there is provided a plurality of second flaps pivotally attached at their upstream end to a downstream end of the first flaps, a unison ring which encircles the second flaps and is connected to the support ring to be movable with the ring, and the second flaps are connected to the unison ring by means of struts.

11. A nozzle according to claim 10 wherein there is provided a plurality of outer flaps pivotally connected at an upstream end to the supporting ring and connected at a downstream location to the second flaps by means of links.

* * * * *